United States Patent
Yae et al.

(10) Patent No.: US 8,980,420 B2
(45) Date of Patent: *Mar. 17, 2015

(54) COMPOSITE MATERIAL COMPRISING SILICON MATRIX AND METHOD OF PRODUCING THE SAME

(75) Inventors: Shinji Yae, Akashi (JP); Tatsuya Hirano, Himeji (JP); Hitoshi Matsuda, Himeji (JP)

(73) Assignee: Japan Science and Technology Agency, Saitama (JP)

( * ) Notice: Subject to any disclaimer, the term of this patent is extended or adjusted under 35 U.S.C. 154(b) by 71 days.

This patent is subject to a terminal disclaimer.

(21) Appl. No.: 12/920,638

(22) PCT Filed: Mar. 2, 2009

(86) PCT No.: PCT/JP2009/053867
§ 371 (c)(1),
(2), (4) Date: Dec. 9, 2010

(87) PCT Pub. No.: WO2009/110428
PCT Pub. Date: Sep. 11, 2009

(65) Prior Publication Data
US 2011/0151242 A1    Jun. 23, 2011

(30) Foreign Application Priority Data
Mar. 5, 2008    (JP) .................................. 2008-054506

(51) Int. Cl.
*B32B 3/26* (2006.01)
*B32B 3/24* (2006.01)
(Continued)

(52) U.S. Cl.
CPC ................. *G11B 5/858* (2013.01); *B82Y 30/00* (2013.01); *C23C 18/1619* (2013.01); *C23C 18/1879* (2013.01); *G11B 5/65* (2013.01); *C23C 18/54* (2013.01)

USPC ......... 428/305.5; 428/131; 428/546; 428/548

(58) Field of Classification Search
USPC ......... 428/131, 305.5, 307.3, 319.1, 546, 548
See application file for complete search history.

(56) References Cited

U.S. PATENT DOCUMENTS

| | | | |
|---|---|---|---|
| 4,376,963 A | 3/1983 | Knoop et al. | 360/135 |
| 5,591,565 A | 1/1997 | Holdermann et al. | 430/314 |

(Continued)

FOREIGN PATENT DOCUMENTS

| | | |
|---|---|---|
| JP | 57-105826 A | 1/1982 |
| JP | 60-004271 A | 1/1985 |

(Continued)

OTHER PUBLICATIONS

Peng et al., "Fabrication of Single-Crystalline Silicon Nanowires by Scratching a Silicon Surface with Catalytic Metal Particles", Advanced Functional Materials, 2006, 16, pp. 387-394.*

(Continued)

*Primary Examiner* — Hai Vo
(74) *Attorney, Agent, or Firm* — Seed IP Law Group PLLC

(57) ABSTRACT

Proposed are a composite material, wherein non-penetrating pores that are formed in a silicon surface layer are filled up with a metal or the like without leaving any voids by using the plating technique, and a method of producing the composite material. A composite material, which has been packed at a high accuracy, or in other words, in which little voids are left, can be obtained by filling up non-penetrating pores that are formed from a silicon surface (100) substantially with a second metal or an alloy of the second metal (106) with the use of the autocatalytic electroless plating technique wherein a first metal located at the bottom of the non-penetrating pores as described above serves as the starting point.

7 Claims, 7 Drawing Sheets

(51) Int. Cl.
G11B 5/858 (2006.01)
B82Y 30/00 (2011.01)
C23C 18/16 (2006.01)
C23C 18/18 (2006.01)
G11B 5/65 (2006.01)
C23C 18/54 (2006.01)

(56) References Cited

U.S. PATENT DOCUMENTS

| | | | |
|---|---|---|---|
| 6,750,111 | B2* | 6/2004 | Schrems ................. 438/386 |
| 7,183,012 | B2 | 2/2007 | Saito et al. ................. 428/831.2 |
| 7,718,254 | B2* | 5/2010 | Matsumura et al. ....... 428/317.9 |
| 7,968,462 | B1 | 6/2011 | Sun et al. |
| 2003/0186084 | A1 | 10/2003 | Saito et al. ............... 428/694 R |
| 2004/0187975 | A1* | 9/2004 | Suemasu et al. .............. 148/522 |
| 2005/0062033 | A1 | 3/2005 | Ichihara et al. |
| 2005/0101153 | A1 | 5/2005 | Matsumura et al. ......... 438/753 |
| 2006/0292294 | A1 | 12/2006 | Klein et al. |
| 2007/0232044 | A1* | 10/2007 | Chowdhury et al. ........ 438/597 |
| 2008/0090074 | A1 | 4/2008 | Matsumura et al. ......... 428/338 |
| 2009/0156426 | A1 | 6/2009 | Schiestel et al. ................ 506/11 |
| 2011/0117373 | A1 | 5/2011 | Yae et al. |
| 2011/0123813 | A1 | 5/2011 | Yae et al. |
| 2012/0321798 | A1 | 12/2012 | Yae et al. |

FOREIGN PATENT DOCUMENTS

| | | |
|---|---|---|
| JP | 06-029246 A | 2/1994 |
| JP | 11-283829 A | 10/1999 |
| JP | 2001-115268 A | 4/2001 |
| JP | 2003-288712 A | 10/2003 |
| JP | 2004-071626 A | 3/2004 |
| JP | 2004-124235 | 4/2004 |
| JP | 2004-193337 A | 7/2004 |
| JP | 2004-237429 A | 8/2004 |
| JP | 2005-105409 A | 4/2005 |
| JP | 2005-139376 A | 6/2005 |
| JP | 2006-342402 A | 12/2006 |
| JP | 2007-119897 A | 5/2007 |
| JP | 2007-533983 A | 11/2007 |
| WO | WO 2005/105308 A1 | 11/2005 |
| WO | 2006/051727 | 5/2006 |
| WO | WO 2009/110428 A1 | 9/2009 |
| WO | WO 2009/110431 A1 | 9/2009 |
| WO | WO 2010/021166 A1 | 2/2010 |

OTHER PUBLICATIONS

Peng et al., "Uniform Axial-Orientation Alignment of One-Dimensional Single-Crystal Silicon Nanostructure Arrays", Angew. Chem. Int. Ed. 2005, 44, pp. 2737-2742.*

Kanungo et al., "Improved contacts on a porous silicon layer by electroless nickel plating and copper thickening," *Semicond. Sci. Technol.* 21:964-970, 2006.

Tsujino et al., "Helical Nanoholes Bored in Silicon by Wet Chemical Etching Using Platinum Nanoparticles as Catalyst," *Electrochemical and Solid-State Letters* 8(12):C193-C195, 2005.

Ito et al., Nanohole Patterned Media, *Fujitsu* 58(1):90-98, Jan. 2007.

Tsujino et al, "Morphology of nanoholes formed in silicon by wet etching in solutions containing HF and $H_2O_2$ at different concentrations using silver nanoparticles as catalysts," *Electrochemica Acta* 53:28-34, 2007.

Yae et al., "Formation of porous silicon by metal particle enhanced chemical etching in HF solution and its application for efficient solar cells," *Electrochemistry Communications* 5:632-636, 2003.

Asoh et al., "Effect of noble metal catalyst species on the morphology of macroporous silicon formed by metal-assisted chemical etching," *Electrochimica Acta* 54:5142-5148, 2009.

Chinese Notice of Written Opinion on the First Examination, issued May 14, 2012, for Chinese Application No. 200980126613.7, 3 pages.

Chinese Notification of Written Opinion on the First Examination, dated Feb. 21, 2012, for Chinese Application No. 200980107159.0, 8 pages.

Communication pursuant to Rules 70(2) and 70a(2) EPC, dated Oct. 25, 2011, for corresponding European Patent Application No. 09717775.2, 1 page.

English Translation of Chinese Notice of Written Opinion on the First Examination, issued May 14, 2012, for Japanese Application No. 200980126613.7, 3 pages.

English Translation of Chinese Notification of Written Opinion on the First Examination, dated Feb. 21, 2012, for Chinese Patent Application No. 200980107159.0, 8 pages.

English translation of Korean Office Action for Korean Application No. 10-2010-7022171, mailed Jun. 8, 2012, 4 pages.

Hirano et al., "Electroless Process for Producing Metal Filled Si Nanopores," ECS Meeting Abstracts MA 2008-02 134, 214th ECS Meeting, 2008, 1 page.

Korean Office Action for Korean Application No. 10-2010-7022171, issued Jun. 8, 2012, 3 pages.

Yae et al., "Metal nanorod production in silicon matrix by electroless process," *Applied Surface Science* 255:4670-4672, 2009.

Japanese Patent Application No. 2010-501898, Japanese Office Action, dated Feb. 8, 2013 (with translation).

U.S. Appl. No. 13/875,198, filed May 1, 2013.

U.S. Appl. No. 14/019,299, filed Sep. 5, 2013.

U.S. Office Action, issued Sep. 16, 2013, for U.S. Appl. No. 13/589,793, 22 pages.

Japanese Office Action for Japanese Application No. 2008-054506, dated Apr. 23, 2013, 2 pages.

English Translation of Japanese Office Action for Japanese Application No. 2008-054506, dated Apr. 23, 2013, 2 pages.

Zschech et al., "High-temperature resistant, ordered gold nanoparticle arrays," *Nanotechnology* 17:2122-2126, 2006.

Japanese Office Action, dated Mar. 25, 2014, for Japanese Application No. 2013-068723, 2 pages.

English Translation of Japanese Office Action, dated Mar. 25, 2014, for Japanese Application No. 2013-068723, 2 pages.

Office Action, dated Aug. 28, 2013, for corresponding Japanese Application No. 200980107159.0, 13 pages, (with English Translation).

Sun et al., "Noble Metal Activation Layer," U.S. Appl. No. 61/017,490, filed Dec. 28, 2007, 30 pages.

Zhang et al., "Selective Electroless Deposition of Cu on an Ultrathin Au Film Pattern," *Macromolecular Rapid Communications* 25:1917-1920, 2004.

* cited by examiner

COMPOSITE MATERIAL COMPRISING SILICON MATRIX AND METHOD OF PRODUCING THE SAME

TECHNICAL FIELD

The present invention relates to a composite material comprising a silicon matrix and a method of producing the same.

BACKGROUND ART

There have been conventionally studied surface treatment methods such as metal coating, nonmetal coating, and chemical conversion coating. So far, various functional composite materials have been created using a matrix of a metal provided on a surface thereof with a film of another metal.

Plating is one of typical examples of the several surface treatment methods. This plating technique is utilized also in the magnetic recording technology, for example. Specifically, there is disclosed a technique of filling up a large number of pores formed in a surface layer of a matrix of alumina ($Al_2O_3$) with cobalt by alternate plating (Non-Patent Document 1, for example). Possibly, this technique will be significantly important in the production of high density magnetic recording media. However, in this technique, there arise problems such as limited decrease in cost in the entire equipment due to necessity of an alternating current power supply and the like. There is also disclosed a technique of forming a porous layer with use of a special substrate and filling up pores in the porous layer with a plating material by displacement plating (Patent Document 1). However, this technique adopting the substrate in a special structure definitely requires the complex production steps and increase in production cost therefor.

Silicon, which is most widely used in the fields of semiconductor, MEMS, and the like, can be a preferable material as a matrix of a magnetic recording medium because of its capability of stable supply. There has been actually proposed a magnetic recording medium using a silicon matrix (Patent Document 2, for example). For example, if developments are made in a technique of plating a silicon surface layer provided with non-penetrating pores with a high degree of accuracy, in other words, so as to leave voids as less as possible, such a technique will be an important element for production of high density magnetic recording media.

Non-Patent Document 1: K. Ito and one other, "Nanohole Patterned Media", Journal FUJITSU, Fujitsu Limited, January 2007, Vol. 58, No. 1, pp. 90-98
Non-Patent Document 2: S. Yae and four others, "Electrochemistry Communications", August 2003, Vol. 5, p. 632
Non-Patent Document 3: K. Tsujino and one other, "Electrochemica Acta", Nov. 20, 2007, Vol. 53, p. 28
Patent Document 1: Japanese Unexamined Patent Publication No. 2006-342402
Patent Document 2: Japanese Unexamined Patent Publication No. S57-105826
Patent Document 3: Japanese Unexamined Patent Publication No. H11-283829
Patent Document 4: Japanese Unexamined Patent Publication No. 2003-288712
Patent Document 5: Japanese Unexamined Patent Publication No. 2004-237429
Patent Document 6: Japanese Unexamined Patent Publication No. 2005-139376
Patent Document 7: Japanese Unexamined Patent Publication No. 2007-533983
Patent Document 8: United States Unexamined Patent Publication No. 2005/0101153

DISCLOSURE OF THE INVENTION

Problems to be Solved by the Invention

As described above, there have been disclosed several techniques of filling up pores with metal by plating. However, adoption of electroplating limitedly achieves decrease in size of the equipment and decrease in cost for the equipment due to necessity of a power supply and electrodes. On the other hand, it is required to go through complex production steps in the technique of filling pores by conventional electroplating.

In order to produce a high density magnetic recording medium comprising a silicon matrix, non-penetrating pores formed in a silicon surface layer need to be filled up with a magnetic material with a high degree of accuracy. What is important for obtaining a highly functional material is the development in the plating technique, which allows pores to be highly accurately filled up with such a magnetic material or a different material. Nevertheless, there has not yet been established any simple and easy plating technique of filling up pores with a high degree of accuracy.

Solutions to the Problems

The present invention solves the above technical problems and significantly contributes to development of functional materials comprising various kinds of silicon matrices. The inventors have studied intensively to find a method of filling up with a plating material pores formed in a silicon surface layer securely regardless of the sizes of the pores. Generally, the smaller the pores are, the more difficult it is to fill up such pores with a plating material without voids being left. In spite of this fact, the inventors have achieved the present invention by finding that bringing about and utilizing a certain special circumstance progress the step of filling up pores with the bottoms thereof serving as starting points even by electroless plating.

In a composite material comprising a silicon matrix according to the present invention, non-penetrating pores are formed in a silicon surface, a first metal located at bottoms of the non-penetrating pores serves as starting points, and the non-penetrating pores are filled up substantially with a second metal or an alloy of the second metal by autocatalytic electroless plating.

In this composite material comprising a silicon matrix, the second metal or an alloy of the second metal (hereinafter in this paragraph, simply referred to as "the second metal or the like") is formed by autocatalytic electroless plating. The second metal or the like therefore serves as a catalytic agent and continuously stimulates reduction of the ions of the second metal or the like even after the second metal or the like covers the first metal. As a result, in this composite material, the non-penetrating pores are filled up with the second metal or the like with the first metal located at the bottoms of the pores serving as the starting points, so that less voids are left in the pores.

A method of producing a composite material comprising a silicon matrix according to the present invention includes: a dispersion/allocation step of dispersing and allocating on a silicon surface a first metal into shapes of particles, islands, or films; a non-penetrating pore formation step of forming non-penetrating pores in the silicon surface by immersing the silicon surface in a second solution including fluoride ions; and a filling step of filling up the non-penetrating pores substantially with a second metal or an alloy of the second metal by autocatalytic electroless plating, by immersing in a third solution including ions of the second metal and a reducing agent, with the first metal located at bottoms of the non-penetrating pores serving as starting points.

In this method of producing a composite material comprising a silicon matrix, the first metal is initially dispersed and allocated on the silicon surface into the shapes of particles, islands, or films. The silicon surface supporting the first metal is then immersed in the second solution including fluoride ions so as to form the pores in the silicon surface layer. In this case, the first metal in the shapes of particles, islands, or films is located at the bottoms of the finally formed non-penetrating pores as if the first metal has dug into the pores. Thereafter, the second metal or an alloy of the second metal (hereinafter in this paragraph, simply referred to as "the second metal or the like") is formed to fill the pores by autocatalytic electroless plating. The second metal or the like therefore serves as a catalytic agent and continuously stimulates reduction of the ions of the second metal or the like even after the second metal or the like covers the first metal. As a result, in this composite material, the second metal or the like fills the non-penetrating pores while the first metal located at the bottoms of the pores serving as the starting points, so that less voids are left in the pores.

Another method of producing a composite material comprising a silicon matrix according to the present invention includes: a dispersion/allocation step of dispersing and allocating on a silicon surface a first metal into shapes of particles, islands, or films by immersing the silicon surface in a first solution including ions of the first metal and fluoride ions; a non-penetrating pore formation step of forming non-penetrating pores in the silicon surface by immersing the silicon surface in a second solution including fluoride ions; and a filling step of filling up the non-penetrating pores substantially with a second metal or an alloy of the second metal by autocatalytic electroless plating, by immersing in a third solution including ions of the second metal and a reducing agent, with the first metal located at bottoms of the non-penetrating pores serving as starting points.

In this method of producing a composite material comprising a silicon matrix, the silicon surface is initially immersed in the first solution including ions of the first metal and fluoride ions, so that the first metal is dispersed and allocated on the silicon surface into the shapes of particles, islands, or films. The silicon surface supporting the first metal is then immersed in the second solution including fluoride ions so as to form the pores in the silicon surface layer. In this case, the first metal in the shapes of particles, islands, or films is located at the bottoms of the finally formed non-penetrating pores as if the first metal has dug into the pores. Thereafter, the second metal or an alloy of the second metal (hereinafter in this paragraph, simply referred to as "the second metal or the like") is formed to fill the pores by autocatalytic electroless plating. The second metal or the like therefore serves as a catalytic agent and continuously stimulates reduction of the ions of the second metal or the like even after the second metal or the like covers the first metal. As a result, in this composite material, the second metal or the like fills the non-penetrating pores while the first metal located at the bottoms of the pores serving as the starting points, so that less voids are left in the pores.

An apparatus for producing a composite material comprising a silicon matrix according to the present invention includes: a dispersion/allocation device for dispersing and allocating on a silicon surface a first metal into shapes of particles, islands, or films; a non-penetrating pore forming device for forming non-penetrating pores in the silicon surface by immersing the silicon surface in a second solution including fluoride ions; and a filling device for filling up the non-penetrating pores substantially with a second metal or an alloy of the second metal by autocatalytic electroless plating, by immersing in a third solution including ions of the second metal and a reducing agent, with the first metal located at bottoms of the non-penetrating pores serving as starting points.

In this apparatus for producing a composite material comprising a silicon matrix, the first metal is initially dispersed and allocated on the silicon surface into the shapes of particles, islands, or films. There are then formed pores in the silicon surface layer with use of the device for immersing the silicon surface supporting the first metal in the second solution including fluoride ions. In this case, the first metal in the shapes of particles, islands, or films is located at the bottoms of the finally formed non-penetrating pores as if the first metal has dug into the pores. Thereafter, the second metal or an alloy of the second metal (hereinafter in this paragraph, simply referred to as "the second metal or the like") is formed by autocatalytic electroless plating with use of the device for filling the pores. The second metal or the like therefore serves as a catalytic agent and continuously stimulates reduction of the ions of the second metal or the like even after the second metal or the like covers the first metal. As a result, in the composite material produced by this apparatus, the second metal or the like fills the non-penetrating pores while the first metal located at the bottoms of the pores serving as the starting points, so that less voids are left in the pores.

Another apparatus for producing a composite material comprising a silicon matrix according to the present invention includes: a dispersion/allocation device for dispersing and allocating on a silicon surface a first metal into shapes of particles, islands, or films by immersing the silicon surface in a first solution including ions of the first metal and fluoride ions; a non-penetrating pore forming device for forming non-penetrating pores in the silicon surface by immersing the silicon surface in a second solution including fluoride ions; and a filling device for filling up the non-penetrating pores substantially with a second metal or an alloy of the second metal by autocatalytic electroless plating, by immersing in a third solution including ions of the second metal and a reducing agent, with the first metal located at bottoms of the non-penetrating pores serving as starting points.

In this apparatus for producing a composite material comprising a silicon matrix, initially with use of the device for immersing the silicon surface in the first solution including ions of the first metal and fluoride ions, the first metal is dispersed and allocated on the silicon surface into the shapes of particles, islands, or films. There are then formed pores in the silicon surface layer with use of the device for immersing the silicon surface supporting the first metal in the second solution including fluoride ions. In this case, the first metal in the shapes of particles, islands, or films is located at the bottoms of the finally formed non-penetrating pores as if the first metal has dug into the pores. Thereafter, the second metal or an alloy of the second metal (hereinafter in this paragraph, simply referred to as "the second metal or the like") is formed by autocatalytic electroless plating with use of the device for filling the pores. The second metal or the like therefore serves as a catalytic agent and continuously stimulates reduction of the ions of the second metal or the like even after the second metal or the like covers the first metal. As a result, in the composite material produced by this apparatus, the second metal or the like fills the non-penetrating pores while the first metal located at the bottoms of the pores serving as the starting points, so that less voids are left in the pores.

It is quite interesting that the filling can be achieved with less voids being left, similarly to the above cases, even in a state where the non-penetrating pores provided in the silicon surface are very fine and a large number of such fine non-penetrating pores are formed. In other words, even with a porous silicon surface, the pores can be filled up with the second metal or an alloy of the second metal with a very high degree of accuracy. Furthermore, it is regarded as significant that the composite material comprising a silicon matrix as described above is formed in an electroless environment throughout the entire steps.

Effects of the Invention

With use of a composite material comprising a silicon matrix according to the present invention, a method of producing a composite material comprising a silicon matrix according to the present invention, or an apparatus for producing the same, non-penetrating pores formed in a silicon surface layer are filled up with a metal or an alloy of the metal with less voids being left.

BEST MODE FOR CARRYING OUT THE INVENTION

Figure 1:
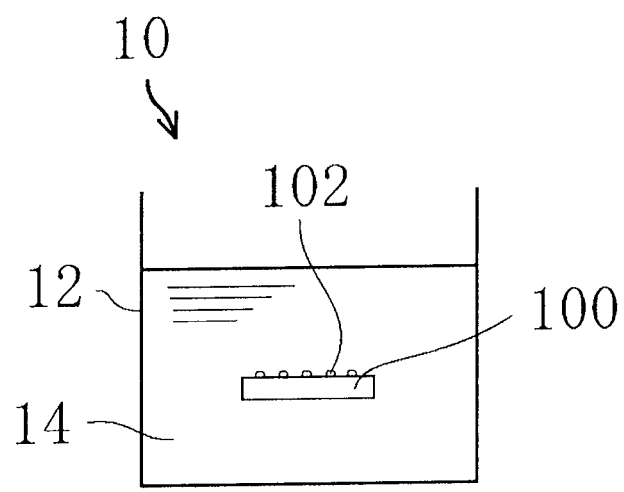
FIG. 1 is a diagram illustrating a dispersion/allocation device for dispersing and allocating first metal particles on a surface of a silicon substrate according to an embodiment of the present invention.

Embodiments of the present invention are described in detail with reference to the accompanying drawings. In the description, common parts are denoted by common reference symbols in all the drawings unless otherwise specified. Further, the elements in these embodiments are not necessarily illustrated in accordance with the same scale in the drawings. Some of the symbols may not be indicated in the drawings for the purpose of simplification in the appearances thereof.

First Embodiment

Figure 2:
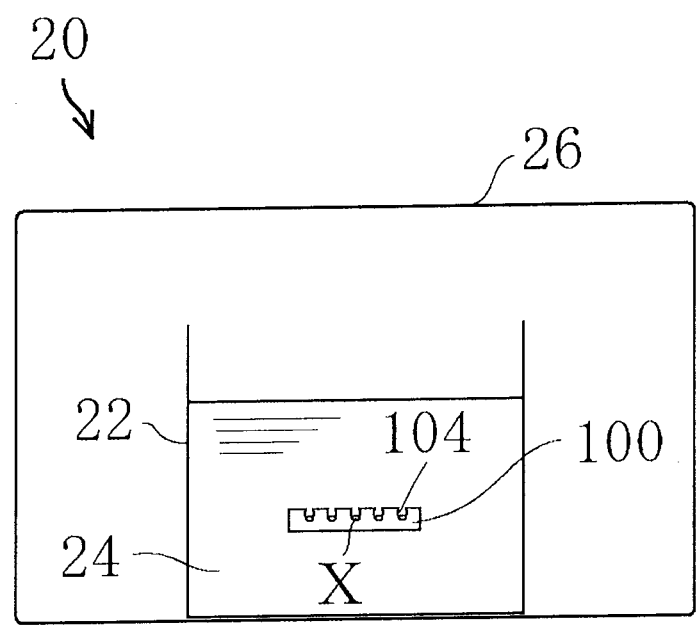
FIG. 2 is a diagram illustrating a non-penetrating pore forming device for forming non-penetrating pores in the surface of the silicon substrate according to the embodiment of the present invention.
Figure 3:
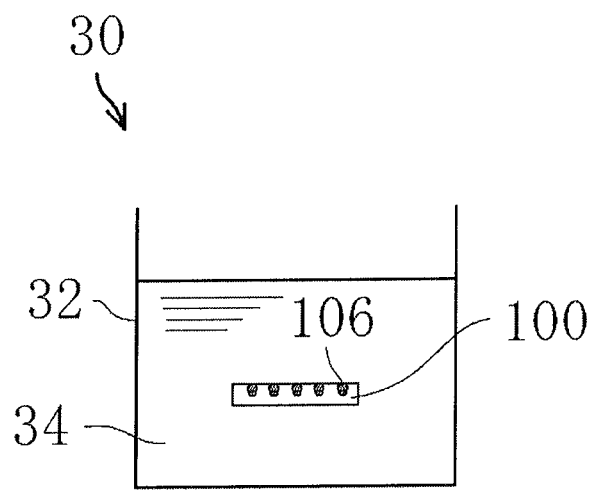
FIG. 3 is a diagram illustrating a filling device for filling a second metal or an alloy of the second metal according to the embodiment of the present invention.

Described in the present embodiment are a composite material comprising a silicon matrix and a method of producing the same. FIG. 1 is a diagram illustrating a dispersion/allocation device 10 for dispersing and allocating first metal particles on a surface of a silicon substrate according to the present embodiment. FIG. 2 is a diagram illustrating a non-penetrating pore forming device 20 for forming non-penetrating pores in the surface of the silicon substrate. FIG. 3 is a diagram illustrating a filling device 30 for filling a second metal in the non-penetrating pores. The present embodiment adopts silver (Ag) as the first metal and cobalt (Co) as a second metal.

Figure 4:
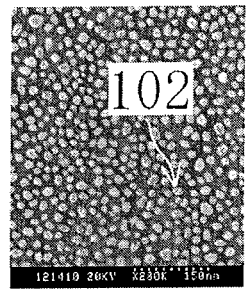
FIG. 4 is a SEM picture showing dispersion/allocation of the first metal particles on the surface of the silicon substrate according to the embodiment of the present invention.

As shown in FIG. 1, in the present embodiment, a silicon substrate 100 is initially immersed for 30 seconds in an aqueous solution (hereinafter, also referred to as a first solution) 14 that is contained in a reservoir 12 and is preliminarily conditioned to 5° C. This aqueous solution 14 includes silver nitrate ($AgNO_3$) of a molarity equal to 1 mmol/L (millimole/liter) and hydrofluoric acid (HF) of a molarity equal to 150 mmol/L. Observed as a result was that silver (Ag) fine particles 102 of diameters from 7 nm to 30 nm were deposited substantially uniformly on the surface of the silicon substrate 100 at a particle density of approximately $1.8 \times 10^{11}$ particles/$cm^2$. FIG. 4 is a picture taken with use of a scanning electron microscope (hereinafter, referred to as a SEM), which shows the surface of the silicon substrate 100 in this case. The silicon substrate 100 in the present embodiment is of a p-type. Although not illustrated for the purpose of simplification of the appearance of the figure, the silicon substrate 100 is immersed while being partially covered with and retained by a holder that is made of a known fluorocarbon resin. Such a holder for the silicon substrate 100 is not shown in FIGS. 2 and 3 to be referred to later.

Figure 5:
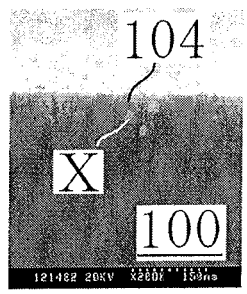
FIG. 5 is a cross sectional SEM picture showing the non-penetrating pores and the fine particles located at the bottoms thereof according to the embodiment of the present invention.

Subsequently, as shown in FIG. 2, in a dark room 26, the silicon substrate 100 supporting the silver fine particles 102 is immersed for 10 minutes in hydrofluoric acid (hereinafter, also referred to as a second solution) 24 that has a molarity of 7.3 mol/L (mole/liter) and is contained in a reservoir 22. Observed as a result were a large number of fine non-penetrating pores 104 that are formed in the surface of the silicon substrate 100. It is quite interesting that the non-penetrating pores 104 were provided with fine particles X at the bottoms thereof. FIG. 5 is a cross sectional SEM picture showing the non-penetrating pores 104 and the fine particles X located at the bottom thereof. This SEM picture indicates that the non-penetrating pores 104 have diameters of several nm to several tens of nm. Therefore, the diameters of the non-penetrating pores 104 well correspond to the diameters of the silver fine particles 102 that are dispersed and allocated on the surface of the silicon substrate 100.

As described above, adopted as the second solution is hydrofluoric acid, which includes no fine particle other than those of silver. It is thus determined in the present embodiment that the fine particles X are the silver fine particles 102 that are formed on the silicon surface with use of the first solution. Further, the SEM picture of FIG. 5 shows that the non-penetrating pores 104 are approximately 50 nm deep in average. Also observed was that the non-penetrating pores 104 were formed in linear shapes in parallel to some extent with the thickness direction of the silicon substrate 100.

Figure 6:
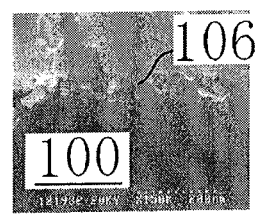
FIG. 6 is a cross sectional SEM picture showing the surface of the silicon substrate and the vicinity thereof, which has been immersed in a third solution, according to the embodiment of the present invention.

Thereafter, as shown in FIG. 3, the silicon substrate 100 provided with the non-penetrating pores 104 described above is immersed in an aqueous solution (hereinafter, also referred to as a third solution) 34 that serves as a plating solution and includes a metal salt of cobalt sulfate ($CoSO_4$) and a reducing agent of dimethylamine-borane (DMAB). In the present embodiment, the silicon substrate 100 was immersed in the third solution for 120 seconds in an electroless environment. FIG. 6 is a cross sectional SEM picture showing the surface of the silicon substrate 100 and the vicinity thereof, which has been immersed in the third solution for 120 seconds. Observed was that the non-penetrating pores 104, which were formed with use of the second solution, were filled up substantially with cobalt (Co) (hereinafter, also referred to as cobalt simply) 106 without voids being left. It is also possible to prevent cobalt (Co) described above from protruding from the surface of the silicon substrate 100 by appropriately controlling the period of immersion. In the present embodiment, it is substantially cobalt (Co) that fills the non-penetrating pores 104, while, quite precisely, it is regarded as a cobalt-boron alloy (Co—B) including boron at approximately 0% to 0.2% in the atomic percentage (atom %).

In the present embodiment, the cobalt (Co) 106 fills the non-penetrating pores 104 without voids being left by autocatalytic electroless plating with the silver fine particles 102 located at the bottoms of the non-penetrating pores 104 serving as the starting points. More specifically, even after the silver fine particles 102, which initially served as a catalytic agent, are covered with the plating material of the cobalt (Co) 106, the cobalt (Co) 106 itself still serves as the catalytic agent to continuously deposit cobalt (Co). The autocatalytic electroless plating sets as the starting points the fine particles 102 of the first metal located at the bottoms of the non-penetrating pores 104 upon plating with use of an alloy of the second metal. Therefore, even in a case where a large number of non-penetrating pores are formed, these pores can be filled accurately with less voids being left.

Moreover, all the steps shown in FIGS. 1 to 3 described above are performed in an electroless environment in the present embodiment. Therefore, the present embodiment is significantly advantageous also in view of cost therefor by applying plating of high mass productivity with use of a matrix of high versatility as well as by requiring no equipment such as electrodes, a power supply, and the like, which are necessary in electroplating.

Second Embodiment

Described in the present embodiment are another composite material comprising a silicon matrix and a method of producing the same. The method of producing the composite material comprising a silicon matrix according to the present embodiment is same as that of the first embodiment except for some conditions. Therefore, the description redundant with that of the first embodiment may not be repeatedly provided.

Figure 7A:
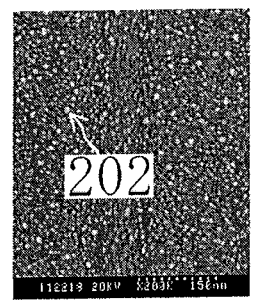
FIG. 7A is a SEM picture according to another embodiment of the present invention, which corresponds to FIG. 4 of a first embodiment.
Figure 7B:
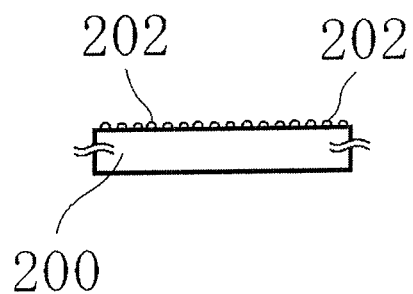
FIG. 7B is a pattern diagram showing a side surface of a silicon substrate on which first metal particles are dispersed and allocated according to the other embodiment of the present invention.

In the present embodiment, first metal particles of gold (Au) were dispersed and allocated on the surface of a silicon substrate with use of a dispersion/allocation device 10 configured as shown in FIG. 1. More specifically, the present embodiment adopts as a first solution an aqueous solution that is preliminarily conditioned to 5° C. and includes tetrachloroauric acid ($HAuCl_4$) of a molarity equal to 1 mmol/L (millimole/liter) and hydrofluoric acid (HF) of a molarity equal to 150 mmol/L. Observed as a result was that gold (Au) fine particles 202 of diameters from 4 nm to 15 nm were deposited substantially uniformly on the surface of a silicon substrate 200 at a particle density of approximately $5.5 \times 10^{11}$ particles/$cm^2$. FIG. 7A, which corresponds to FIG. 4 of the first embodiment, is a SEM picture showing dispersion/allocation of the first metal particles of gold (Au) on the surface of the silicon substrate in the present embodiment. FIG. 7B is a pattern diagram showing a side surface of the silicon substrate 200 on which the first metal 202 of gold (Au) is dispersed and allocated.

Figure 8:
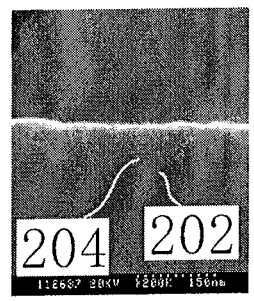
FIG. 8 is a cross sectional SEM picture according to the other embodiment of the present invention, which corresponds to FIG. 5 of the first embodiment.

Subsequently, the silicon substrate 200 supporting the gold fine particles 202 was immersed in a second solution same as that of the first embodiment. In the present embodiment, the period of immersion was 15 minutes. Observed as a result were a large number of fine non-penetrating pores 204 that are formed in the surface of the silicon substrate 200. Again in the present embodiment, the non-penetrating pores 204 were provided at the bottoms thereof with fine particles, which were assumed to be of gold (Au) described above. FIG. 8, which corresponds to FIG. 5 of the first embodiment, is a cross sectional SEM picture capturing the non-penetrating pores 204 and the gold fine particles 202 located at the bottoms thereof. This SEM picture of FIG. 8 also shows that the non-penetrating pores 204 are approximately 100 nm deep in average. Also observed was that, similarly to the first embodiment, the non-penetrating pores 204 were formed in linear shapes in parallel to some extent with the thickness direction of the silicon substrate 200.

Figure 9:
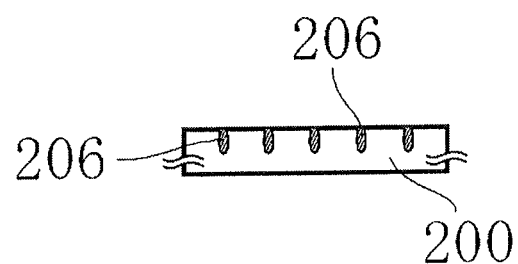
FIG. 9 is a pattern diagram showing the side surface of the silicon substrate filled up with an alloy of a second metal according to the other embodiment of the present invention.

Thereafter, the silicon substrate 200 provided with the non-penetrating pores 204 described above is immersed in an aqueous solution (hereinafter, also referred to as a third solution) that serves as a plating solution and includes a metal salt of cobalt sulfate ($CoSO_4$) and a reducing agent of sodium phosphinate ($NaH_2PO_2$). In the present embodiment, the silicon substrate 200 was immersed in the third solution for 300 seconds in an electroless environment. As shown in FIG. 9, observed as a result was that the non-penetrating pores 204 formed with use of the second solution were filled up with a cobalt-phosphorus alloy (Co—P) serving as an alloy 206 of a second metal without voids being left.

Again in the present embodiment, as described above, the cobalt-phosphorus alloy (Co—P) fills the non-penetrating pores 204 without voids being left by autocatalytic electroless plating with the gold fine particles 202 located at the bottoms of the non-penetrating pores 204 serving as the starting points. In other words, also in the present embodiment, all the steps described above are performed in an electroless environment. Therefore, the present embodiment requires no equipment such as electrodes, a power supply, and the like, which are necessary in electroplating. The autocatalytic electroless plating sets as the starting points the fine particles 202 of the first metal located at the bottoms of the non-penetrating pores 204 upon plating with use of the second metal. Therefore, even in a case where a large number of non-penetrating pores are formed, these pores can be filled accurately with less voids being left.

Third Embodiment

Described in the present embodiment are a different composite material comprising a silicon matrix and a method of producing the same. Since the method of producing the composite material comprising a silicon matrix according to the present embodiment is same as that of the first embodiment except for some conditions. Therefore, the description redundant with that of the first embodiment may not be repeatedly provided.

In the present embodiment, first metal particles of silver (Ag) were dispersed and allocated on the surface of a silicon substrate with use of a dispersion/allocation device 10 configured as shown in FIG. 1. More specifically, the present embodiment adopts as a first solution an aqueous solution that is preliminarily conditioned to 5° C. and includes silver nitrate ($AgNO_3$) of a molarity equal to 1 mmol/L (millimole/liter) and hydrofluoric acid (HF) of a molarity equal to 150 mmol/L.

Subsequently, the silicon substrate supporting the silver (Ag) fine particles was immersed in a second solution same as that of the first embodiment. In the present embodiment, the period of immersion was 15 minutes. Observed as a result were a large number of fine non-penetrating pores that were formed in the surface of the silicon substrate. Again in the present embodiment, the non-penetrating pores were provided at the bottoms thereof with fine particles, which were assumed to be of silver (Ag) described above. The non-penetrating pores in the present embodiment were approximately 100 nm deep in average with a maximum depth of approximately 180 nm. Also observed was that, similarly to the first embodiment, the non-penetrating pores were formed in linear shapes in parallel to some extent with the thickness direction of the silicon substrate.

Thereafter, the silicon substrate provided with the non-penetrating pores is immersed in an aqueous solution (hereinafter, also referred to as a third solution) that serves as a plating solution and includes metal salts of cobalt sulfate ($CoSO_4$) and nickel sulfate ($NiSO_4$) and a reducing agent of dimethylamine-borane (DMAB). In the present embodiment, the silicon substrate was immersed in the third solution for 120 seconds in an electroless environment. Observed as a result was that the non-penetrating pores formed with use of the second solution were filled up with a cobalt-nickel-boron alloy (Co—Ni—B) without voids being left. In the present embodiment, there were included cobalt at approximately 90% in the atomic percentage (atom %), nickel at approximately 6% in the atomic percentage (atom %), and boron at approximately 4% in the atomic percentage (atom %).

Figure 10:
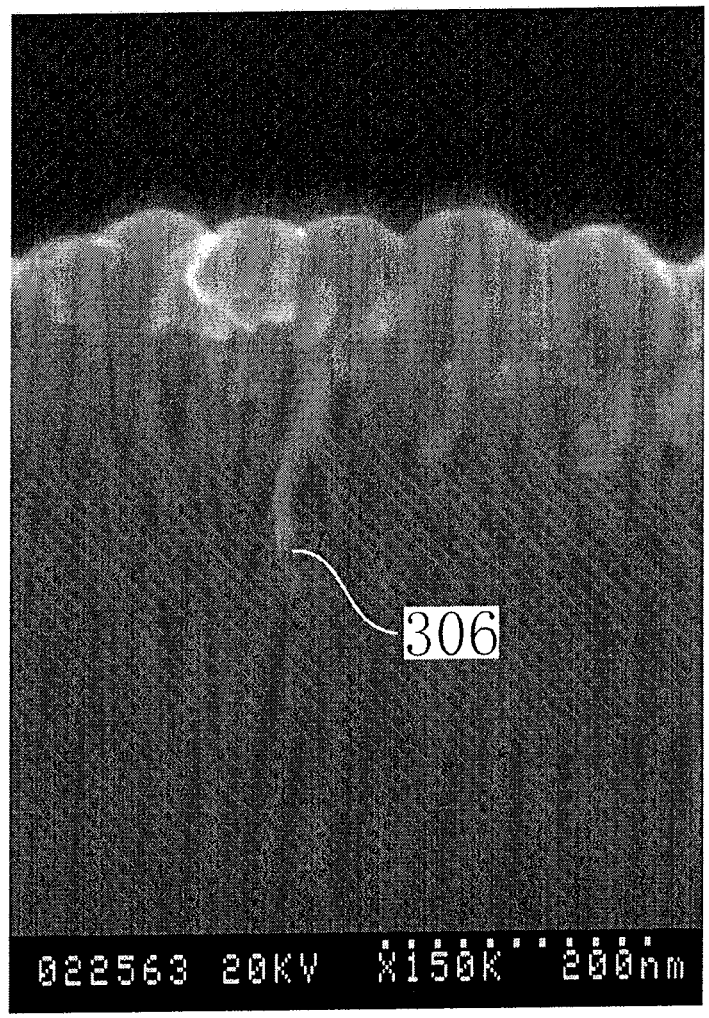
FIG. 10 is a cross sectional SEM picture showing a silicon substrate filled up with an alloy of a second metal according to a different embodiment of the present invention.

Again in the present embodiment, as described above, the cobalt-nickel-boron alloy (Co—Ni—B) as an alloy 306 of a second metal fills the non-penetrating pores without voids being left by autocatalytic electroless plating with the silver (Ag) fine particles located at the bottoms of the non-penetrating pores serving as the starting points. FIG. 10 is a cross sectional SEM picture of the silicon substrate provided with the non-penetrating pores that have been filled up with the cobalt-nickel-boron alloy (Co—Ni—B) serving as the alloy 306 of the second metal.

In the present embodiment, similarly to those embodiments already described, all the above steps are performed in an electroless environment. Therefore, the present embodiment requires no equipment such as electrodes, a power supply, and the like, which are necessary in electroplating. The autocatalytic electroless plating sets as the starting points the fine particles of the first metal located at the bottoms of the non-penetrating pores upon plating with use of the second metal. Therefore, even in a case where a large number of non-penetrating pores are formed, these pores can be filled accurately with less voids being left.

Other Embodiments

The above embodiments adopt, as a plating material to fill up the pores, cobalt (Co), the cobalt-nickel-boron alloy (Co—Ni—B), and the cobalt-phosphorus alloy (Co—P), respectively. However, the present invention is not limited to these cases. Alternatively, for example, a nickel-boron alloy (Ni—B), a nickel-phosphorus alloy (Ni—P), or copper (Cu) can be selected as a plating material to fill up a large number of fine non-penetrating pores by autocatalytic electroless plating as in the respective embodiments described above.

Figure 11:
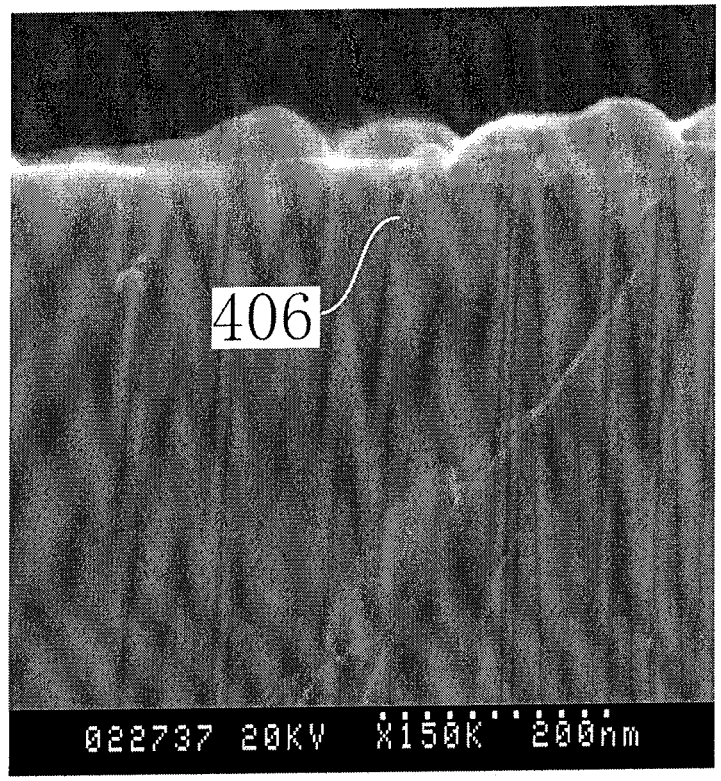
FIG. 11 is a cross sectional SEM picture showing a silicon substrate filled up with an alloy of a second metal according to a different embodiment of the present invention.

More specifically, the present embodiment adopts as a first solution an aqueous solution that includes silver nitrate ($AgNO_3$) of a molarity equal to 1 mmol/L (millimole/liter) and hydrofluoric acid (HF) of a molarity equal to 150 mmol/L in order to fill up pores with a nickel-boron alloy (Ni—B) as the plating material. Subsequently, a silicon substrate on which a first metal of silver (Ag) is dispersed and allocated is immersed in a second solution same as that of the first embodiment. Then adopted as a third solution is an aqueous solution that includes a metal salt of nickel sulfate and a reducing agent of dimethylamine-borane (DMAB) so as to fill up the non-penetrating pores in the silicon substrate with the nickel-boron alloy (Ni—B). FIG. 11 is a SEM picture showing the state where the non-penetrating pores are filled up with the nickel-boron alloy (Ni—B) serving as an alloy 406 of a second metal.

The above embodiments respectively adopt the first solution including hydrofluoric acid. However, the present invention is not limited the cases. An effect substantially same as that of the present invention is exerted even in a case where ammonium fluoride ($NH_4F$) or the like is adopted in place of hydrofluoric acid.

While the above embodiments respectively select silver (Ag) or gold (Au) as the first metal, the present invention is not limited these cases. There may be alternatively used palladium (Pd), platinum (Pt), or rhodium (Rh), for example. More specifically, an effect substantially same as that of the present invention is exerted as long as the first metal is a catalytic agent serving as the starting points and causes the second metal or an alloy of the second metal to serve as an autocatalytic plating material. Moreover, an effect substantially same as that of the present invention is exerted even in a case where several kinds of metals are selected out of the metals already described and are dispersed and allocated on the silicon. Although not referred to in the above description of the respective embodiments, the first metal is not necessarily a pure metal including no impurities in any one of the above embodiments. The effect of the present invention is substantially exerted even in a case where the first metal includes an impurity that is possibly included in ordinary cases.

Although not noted in the above description of the respective embodiments, the substances to fill the non-penetrating pores may include the second metal or an alloy of the second metal as well as an impurity, though slightly, such as carbon (C), oxygen (O), hydrogen (H), an additive like formalin or saccharin, which is included in a plating bath, or a decomposition product of any one of the substances exemplified above.

Furthermore, in the respective embodiments, the second metal or an alloy of the second metal fills the non-penetrating pores up to the opening ends thereof. However, the non-penetrating pores can be filled up to a depth lower than the opening ends thereof by controlling the periods of the respective steps. Therefore, the "filling" in the present application has an idea inclusive of provision of the second metal in the non-penetrating pores not up to the opening ends thereof, in other words, imperfect filling in the non-penetrating pores.

In the above embodiments, a large number of first metal particles are dispersed and allocated on the surface of the silicon substrate, so that the non-penetrating pores provided in the silicon surface are porous. However, the present invention is not limited to such a case.

Figure 12:
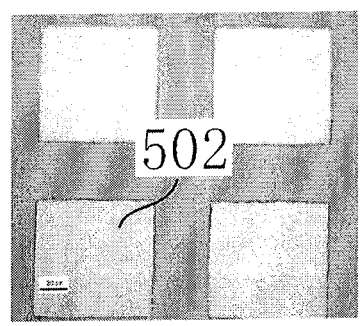
FIG. 12 is a picture taken with use of an optical microscope, showing a surface of a silicon substrate provided with a first metal film according to a different embodiment of the present invention.
Figure 13:
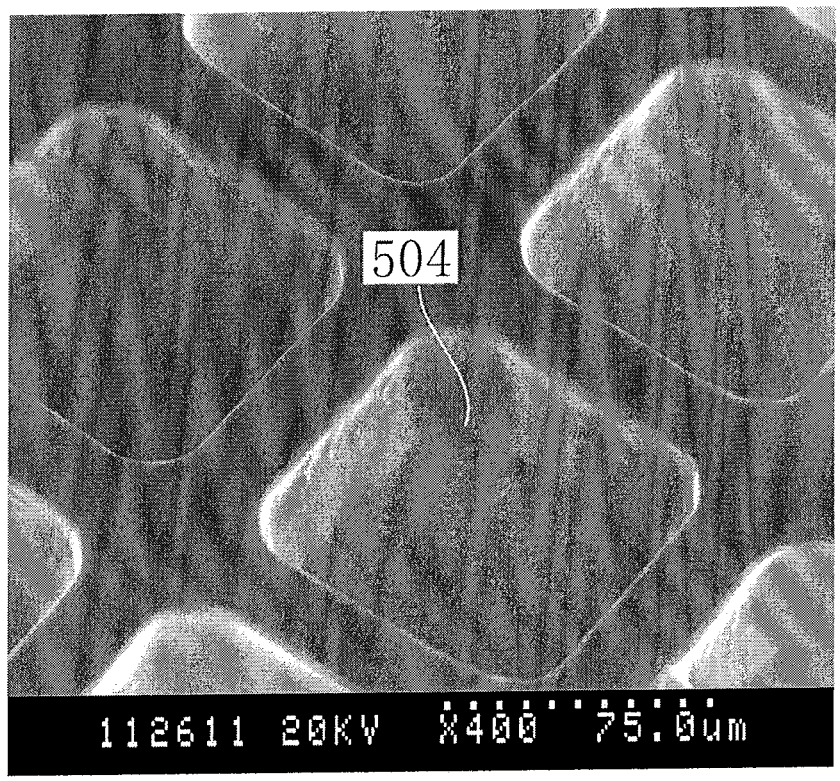
FIG. 13 is a SEM picture showing non-penetrating pores formed along the shape of the first metal according to the different embodiment of the present invention.
Figure 14:
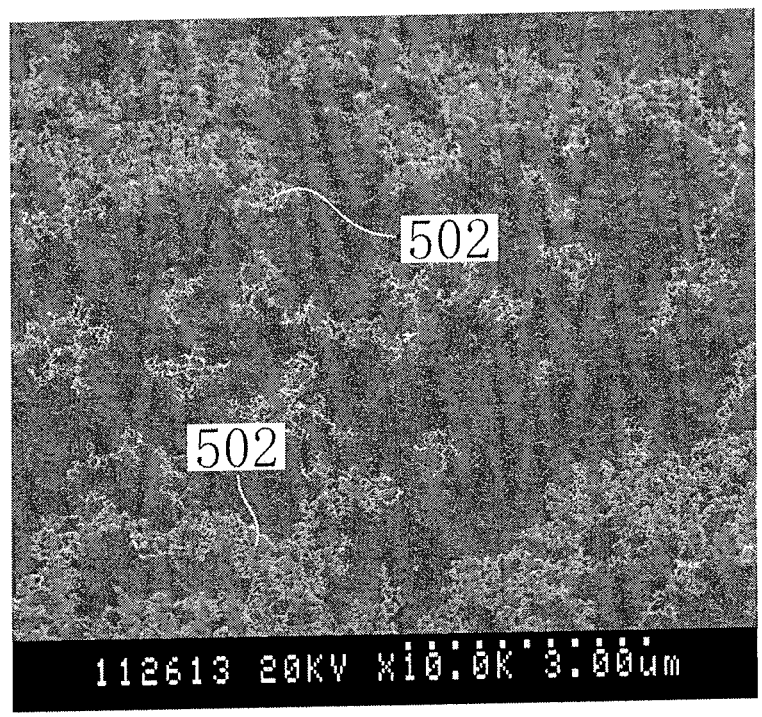
FIG. 14 is a SEM picture showing a state where the first metal in the shapes of particles, islands, or films is allocated at the bottoms of the non-penetrating pores according to the different embodiment of the present invention.

For example, FIG. 12 shows a case where a film of palladium (Pd) as a first metal 502 is patterned into square shapes of 29 nm thick and 85 μm long in each side on a silicon substrate by vacuum vapor deposition with use of a known metal mask. Even in such a case, there is exerted an effect substantially similar to that of the present invention. More specifically, as shown in FIG. 13, there are initially formed non-penetrating pores 504 of approximately 30 μm deep so as to be substantially along the outer shapes of the patterned first metal. As shown in FIG. 14, observed at the bottoms of the non-penetrating pores 504 was palladium (Pd) 502 in the shapes of particles, islands, or films. Thereafter, by using, similarly to the embodiments described above, cobalt sulfate ($CoSO_4$) as a metal salt and sodium phosphinate ($NaH_2PO_2$) as a reducing agent, the non-penetrating pores 504 can be filled up with a cobalt-phosphorus alloy (Co—P) as an alloy of a second metal.

As described above, the present invention exerts the same effect even in a case where the first metal is provided as a deposited film. There is thus no particular limitation to means for dispersing and allocating on a silicon surface a first metal in the shapes of particles, islands, or films. For example, the first metal is dispersed and allocated on the silicon surface even in a case where a suspension including the first metal particles dispersed therein is applied onto the silicon surface by spin coating. Therefore exerted is an effect similar to that of the present invention. As described above, the scope of claims is inclusive of modifications made within the scope of the present invention such as other combinations of the respective embodiments.

INDUSTRIAL APPLICABILITY

The present invention is widely applicable as a technical element for a functional composite material. For example, the present invention can be applied to vertical magnetic recording media of high density, as well as to various types of sensors and electrode materials.

The invention claimed is:

1. A composite material comprising a silicon matrix, the composite material comprising:
   non-penetrating pores in a silicon surface, the non-penetrating pores having a side surface and a bottom surface and a maximum depth of 180 nm;
   a first metal in direct contact with the bottom surface of the non-penetrating pores; and
   a second metal, or an alloy thereof, substantially filling the remaining volume of the non-penetrating pores and in direct contact with the side surface of the non-penetrating pores and in direct contact with the first metal,
   wherein the first metal is in the shape of particles or islands within the non-penetrating pores.

2. The composite material of claim 1, wherein:
   the silicon surface is porous by provision of the non-penetrating pores.

3. The composite material of claim 1 or 2, wherein:
   the first metal comprises at least one metal selected from palladium (Pd), silver (Ag), gold (Au), platinum (Pt), and rhodium (Rh).

4. The composite material of claim 1 or 2, wherein:
   the first metal is silver (Ag) or gold (Au), and the second metal is cobalt (Co).

5. The composite of claim 1, wherein the non-penetrating pores are substantially filled with the second metal or alloy thereof by autocatalytic electroless plating.

6. The composite of claim 1, wherein the first metal is in the shape of particles.

7. The composite of claim 1, wherein the first metal is in the shape of islands.

* * * * *